United States Patent [19]

Itakura et al.

[11] Patent Number: 4,475,091
[45] Date of Patent: Oct. 2, 1984

[54] COMPOSITE FUNCTION ELEMENT AND PROCESS FOR PRODUCING THE SAME

[75] Inventors: Gen Itakura, Hirakata; Yoshihiro Matsuo, Neyagawa, both of Japan

[73] Assignee: Matsushita Electric Industrial Co., Ltd., Kadoma, Japan

[21] Appl. No.: 265,707

[22] Filed: May 21, 1981

[30] Foreign Application Priority Data

May 30, 1980 [JP] Japan .................. 55-73060

[51] Int. Cl.³ .................. H03H 1/02; H03H 7/24
[52] U.S. Cl. .................. 333/17 L; 333/172; 357/10
[58] Field of Search .................. 333/17 L, 167, 172, 333/81 R; 307/320; 357/10; 338/13–14, 20, 21, 22 R; 148/33.2, 33.3

[56] References Cited

U.S. PATENT DOCUMENTS

| | | | |
|---|---|---|---|
| 3,299,332 | 1/1967 | Saburi | 357/10 |
| 3,386,856 | 6/1968 | Noorlander | 357/10 X |
| 3,441,517 | 4/1969 | Brauer et al. | 357/10 X |
| 4,131,903 | 12/1978 | Schmelz et al. | 357/10 |

Primary Examiner—Marvin L. Nussbaum
Attorney, Agent, or Firm—Stevens, Davis, Miller & Mosher

[57] ABSTRACT

This invention relates to a composite function element which includes a high resistance thin film layer containing the constitutional elements of a perovskite type oxide and specified impurity elements at the grain boundary of a sintered body, said sintered body comprises an agglomerate of n type semiconductor particles and to a process for producing said composite function element. The composite function element has a composite function such that it acts as a varistor passing high voltages at a high voltage and as a capacitor passing the currents of abnormal frequency zone at a low voltage, so that the functions of two elements, a varistor and a capacitor, can be fulfilled simultaneously with only one element. Therefore, its extensive application in uses such as, for example, prevention of erroneous operation of microcomputer-controlled instruments can be expected.

2 Claims, 5 Drawing Figures

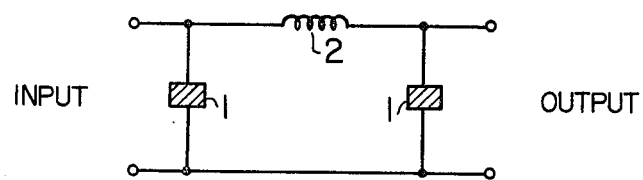
FIG. 1
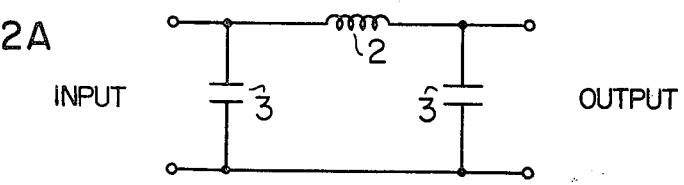
FIG. 2A
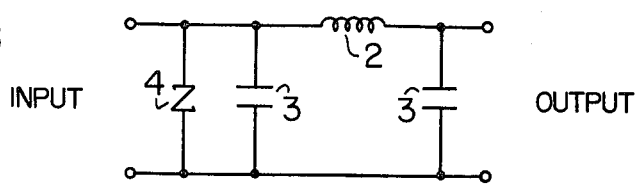
FIG. 2B
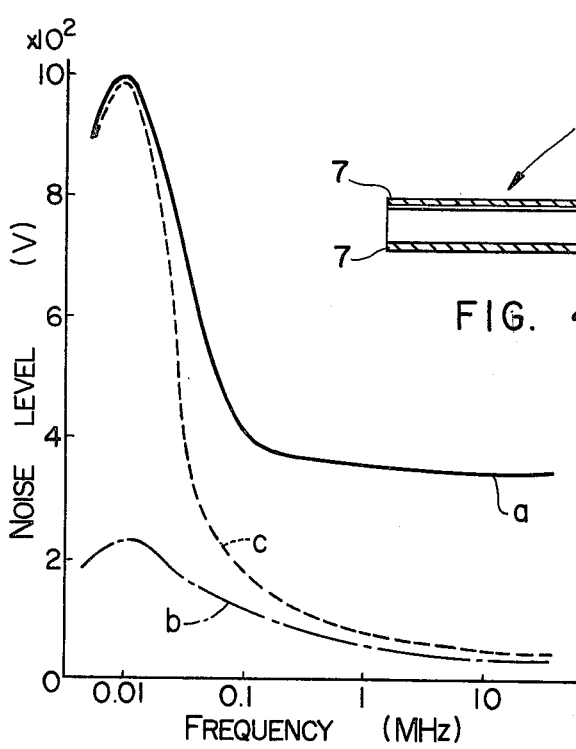
FIG. 3
FIG. 4

COMPOSITE FUNCTION ELEMENT AND PROCESS FOR PRODUCING THE SAME

TECHNICAL FIELD

This invention relates to a composite function element having a composite function such that the roles of both varistor and capacitor can be performed simultaneously with one element.

BACKGROUND ART

Electronic materials based on utilization of the grain boundary of semiconductor particles are hitherto known, of which one example is the voltage-nonlinear resistor element (zinc oxide varistor) composed mainly of zinc oxide. The zinc oxide varistor is an element obtainable by adding a very small quantity of $Bi_2O_3$, CoO, MnO, $Sb_2O_3$ or the like to zinc oxide and firing the mixture. Its voltage nonlinearity is comparable to that of a Zener diode, and its voltage nonlinearity index $\alpha$ is as great as 50. Since such an element is excellent in performing in high voltage absorption, it is in use for the purpose of stabilizing the voltage of electronic instrument circuits and for protecting such circuits against abnormal voltage (surge). However, such a zinc oxide varistor is low in dielectric constant $\epsilon$, and its dielectric loss (tan $\delta$) is as great as 5-10%, so that it functions poorly as a capacitor and accordingly has been exclusively used for fulfilling the variator function.

A grain boundary layer type semiconductor porcelain capacitor is another typical example of a element in which the grain boundary of semiconductor particles is utilized. The grain boundary layer type semiconductor porcelain capacitor is an element obtainable by re-oxidizing the grain boundary of semiconductor porcelain such as barium titanate, strontium titanate or the like, or by compensating the valencies of the porcelain. The apparent dielectric constant of this type of capacitor is as high as 50,000-60,000. Since it has a dielectric loss (tan $\delta$) of about 1%, it can serve as a small-sized capacitor having high capacity. However, since its voltage nonlinearity index is as small as about 1-2 and since it cannot resist an electric current higher than 1 mA, it cannot function as a varistor. Accordingly, it is exclusively in use as a capacitor.

Recently, electric and electronic instruments have come to require a very high degree of control. It is the current tendency that not only industrial instruments but also domestic ones require a very high degree of accuracy as the result of the introduction of microcomputers. Since the logic circuits of microcomputers and the like are operated by pulse signals, these circuits are easily influenced by noise. If electronic computers, banking machines, traffic control instruments and the like fall into an erroneous operation or a breakdown due to noise or surge, there can be incurred a social problem. As a counter-measure for this problem, noise filters have hitherto been employed. The term "noise" refers to an interferential voltage different from the required signal voltage which appears in operating electronic instruments. This type of noise is classified into artificially occurring noise and naturally occurring noise. Such noise has hitherto been removed by means of the so-called noise filter which is a combination of a coil and a capacitor. However, some types of artificially occurring noise and particularly that due to the circuit breakers of transmission and distribution lines, as well as some type of naturally occurring noise and particularly that due to lightning surges, have a fundamental frequency as low as about 5-20 KHz. It has been impossible to remove this low frequency noise with only the hitherto known combination of coil and capacitor. In view of this problem, there is often used a noise filter which also has a voltage nonlinearity resistor (varistor) between lines or between line and earth. Such a noise filter is effective for preventing the erroneous operation of microcomputer-controlled instruments because a wide range of noise can be removed with it. However, such a noise filter has a great number of parts inside its set, so that its cost is high and it is contrary to the current tendency toward miniaturization.

DISCLOSURE OF THE INVENTION

The present invention overcomes the above-discussed problems by providing a high resistance thin film layer containing the constitutional elements of a perovskite type oxide and specified impurity elements at the grain boundary of a sintered body consisting of an agglomerate of semiconductor particles. The high resistance thin film layer has a composite function such that it acts as a capacitor passing the currents of abnormal frequency zone at a low voltage and acts as a varistor passing the currents of high voltage at a high voltage.

Thus, the element of the present invention has a composite function of varistor and capacitor, so that a single element is sufficient to fulfil the requirements in circuits which have hitherto been constructed by interconnecting a varistor and a capacitor in parallel. The element of the present invention can be obtained by forming, by the method of thermal diffusion, a high resistance thin film layer mainly comprising a perovskite type oxide and also containing specified impurities at the grain boundary of an agglomerate of semiconductor particles. Although a grain boundary layer type semiconductor capacitor is also obtainable by the thermal diffusion method, the decisive difference between it and the element of the present invention is the fact that a grain boundary layer type semiconductor capacitor is obtained by letting valency-compensating elements diffuse into the grain boundary of a sintered product comprising semiconductor particles of a perovskite type oxide, thereby forming an insulating layer at the grain boundary, whereas the element of the present invention is obtained by thermally diffusing a substance simultaneously containing a perovskite type oxide and specified elements, thereby forming a grain boundary layer having the above-mentioned composite function.

BRIEF EXPLANATION OF THE DRAWINGS

FIG. 1 is a circuit diagram illustrating one example of a noise filter circuit in which the element of the present invention is used;

FIGS. 2A and 2B are circuit diagrams illustrating examples of a hitherto known circuit corresponding to FIG. 1;

FIG. 3 is a graph illustrating the states of input noises and output noises respectively corresponding to the circuits shown in FIG. 1, FIG. 2A and FIG. 2B; and FIG. 4 is a cross-sectional view of a composite function element according to the present invention.

BEST MODE FOR CARRYING OUT THE INVENTION

A sintered body having a specific resistance of 0.2-0.5 $\Omega$·cm and an average particle diameter of 10-20

μm was prepared by adding niobium pentoxide in an amount ranging from 0.1% to 0.5% per mole to a commercial powder of strontium titanate having a purity of 97.5% or more, homogenizing them, forming the mixture and then firing it in a reductive atmosphere at a temperature ranging from 1,350° C. to 1,420° C. This sintered body had a diameter of 12.5 mm with a thickness of 0.5 mm.

Table 1 shows the details of the composition which was attached to said sintered body and allowed to diffuse thereinto. The diffusing components shown in Table 1 were attached to the surface of said sintered body in an amount of 5/10,000–1/100 parts by weight per 1 part by weight of said sintered body, were allowed to thermally diffuse for 1–5 hours at a temperature of 1,000°–1,300° C., after which baked silver electrodes were provided on both the surfaces of said sintered body Table 2 illustrates the results obtained by measuring the electrical characteristics of said element. A composite function element of the type just described is shown in FIG. 4, wherein the structural relationship of the sintered body 5, high resistance thin film layer 6 and electrodes 7 of the element 1 is illustrated.

TABLE 2

| Data No. | Diffusing component Sample No. | Electrical characteristics | | | |
|---|---|---|---|---|---|
| | | V/mm (volt) | α | ε | tan δ (%) |
| 1 | 1 | 56 | 4 | 59600 | 1.3 |
| 2 | 2 | 72 | 4 | 48700 | 0.7 |
| 3 | 3 | 56 | 4 | 55200 | 1.2 |
| 4 | 4 | 83 | 5 | 47300 | 1.6 |
| 5 | 5 | 207 | 6 | 44500 | 0.5 |
| 6 | 6 | 103 | 4 | 52800 | 1.7 |
| 7 | 7 | 35 | 4 | 53900 | 1.3 |
| 8 | 8 | 183 | 6 | 49900 | 1.8 |
| 9 | 9 | 52 | 4 | 41300 | 2.1 |
| 10 | 10 | 48 | 4 | 55700 | 1.5 |
| 11 | 11 | 67 | 3 | 49500 | 0.8 |
| 12 | 12 | 61 | 4 | 52700 | 1.7 |
| 13 | 13 | 39 | 4 | 60200 | 1.1 |
| 14 | 14 | 230 | 6 | 41800 | 0.4 |
| 15 | 15 | 172 | 6 | 45600 | 0.7 |
| 16 | 16 | 167 | 6 | 43900 | 0.7 |
| 17 | 17 | 143 | 5 | 47100 | 0.9 |
| 18 | 18 | 98 | 4 | 50300 | 0.5 |
| 19 | 19 | 255 | 10 | 41500 | 0.6 |
| 20 | 20 | 189 | 5 | 43700 | 0.5 |
| 21 | 21 | 148 | 5 | 46300 | 0.4 |
| 22 | 22 | 156 | 8 | 40200 | 0.4 |
| 23 | 23 | 172 | 7 | 50300 | 0.6 |
| 24 | 24 | 144 | 7 | 42100 | 0.6 |
| 25 | 25 | 215 | 8 | 43300 | 0.4 |
| 26 | 26 | 243 | 8 | 48100 | 0.4 |
| 27 | 27 | 250 | 11 | 45200 | 0.3 |

TABLE 1

| Composition No. | Components of diffusing composition (The numerical figures express molar ratios.) | | | | | | | | | | | | | |
|---|---|---|---|---|---|---|---|---|---|---|---|---|---|---|
| | $SrTiO_3$ | $Bi_2O_3$ | $B_2O_3$ | $CeO_2$ | $CoO$ | $CuO$ | $Fe_2O_3$ | $La_2O_3$ | $MnO_2$ | $Nb_2O_5$ | $Sb_2O_3$ | $SiO_2$ | $ZnO$ | $TiO_2$ | $Li_2CO_3$ |
| 1 | 5 | 90 | — | — | — | — | — | — | — | — | — | — | — | — | — |
| 2 | 5 | 90 | 5 | — | — | — | — | — | — | — | — | — | — | — | — |
| 3 | 5 | 90 | — | 5 | — | — | — | — | — | — | — | — | — | — | — |
| 4 | 5 | 90 | — | — | 5 | — | — | — | — | — | — | — | — | — | — |
| 5 | 5 | 90 | — | — | — | 5 | — | — | — | — | — | — | — | — | — |
| 6 | 5 | 90 | — | — | — | — | 5 | — | — | — | — | — | — | — | — |
| 7 | 5 | 90 | — | — | — | — | — | 5 | — | — | — | — | — | — | — |
| 8 | 5 | 90 | — | — | — | — | — | — | 5 | — | — | — | — | — | — |
| 9 | 5 | 90 | — | — | — | — | — | — | — | 5 | — | — | — | — | — |
| 10 | 5 | 90 | — | — | — | — | — | — | — | — | 5 | — | — | — | — |
| 11 | 5 | 90 | — | — | — | — | — | — | — | — | — | 5 | — | — | — |
| 12 | 5 | 90 | — | — | — | — | — | — | — | — | — | — | 5 | — | — |
| 13 | 5 | 90 | — | — | — | — | — | — | — | — | — | — | — | 5 | — |
| 14 | 5 | 85 | 5 | — | — | 5 | — | — | — | — | — | — | — | — | — |
| 15 | 5 | 85 | — | 5 | — | 5 | — | — | — | — | — | — | — | — | — |
| 16 | 5 | 85 | — | — | 5 | 5 | — | — | — | — | — | — | — | — | — |
| 17 | 5 | 85 | — | — | — | 5 | 5 | — | — | — | — | — | — | — | — |
| 18 | 5 | 85 | — | — | — | 5 | — | 5 | — | — | — | — | — | — | — |
| 19 | 5 | 85 | — | — | — | 5 | — | — | 5 | — | — | — | — | — | — |
| 20 | 5 | 85 | — | — | — | 5 | — | — | — | 5 | — | — | — | — | — |
| 21 | 5 | 85 | — | — | — | 5 | — | — | — | — | 5 | — | — | — | — |
| 22 | 5 | 85 | — | — | — | 5 | — | — | — | — | — | 5 | — | — | — |
| 23 | 5 | 85 | — | — | — | 5 | — | — | — | — | — | — | 5 | — | — |
| 24 | 5 | 85 | — | — | — | 5 | — | — | — | — | — | — | — | 5 | — |
| 25 | 5 | 80 | — | — | — | 5 | — | — | 5 | — | — | — | — | 5 | — |
| 26 | 5 | 80 | — | — | — | 5 | — | — | 5 | — | — | — | — | — | 5 |
| 27 | 5 | 80 | 5 | — | — | 5 | — | — | 5 | — | — | — | — | — | — |
| 28 | 5 | 80 | — | — | 5 | 5 | — | — | 5 | — | — | — | — | — | — |
| 29 | 5 | 80 | — | — | 5 | — | — | — | 5 | — | — | 5 | — | — | — |
| 30 | 5 | 75 | — | — | 5 | — | — | — | 5 | 5 | — | 5 | — | — | — |
| 31 | 5 | 70 | — | — | 5 | 5 | — | — | 5 | — | 5 | 5 | — | — | — |
| 32 | 5 | 75 | 5 | — | — | 5 | — | — | 5 | — | — | — | — | — | 5 |
| 33 | 5 | 75 | 2.5 | — | — | 5 | — | — | 2.5 | — | 2.5 | — | 2.5 | — | 5 |
| 34 | 5 | 70 | 5 | — | — | 5 | — | 5 | 5 | — | — | — | — | 5 | — |
| 35 | 5 | 70 | 2.5 | 0.5 | 2.5 | 5 | 0.5 | 2.5 | 2.5 | 0.5 | 0.5 | 0.5 | 0.5 | 2.5 | 0.5 |
| 36* | 0 | 80 | 5 | — | — | 5 | — | — | 5 | — | — | — | — | — | — |
| 37* | 0 | 80 | — | — | 5 | 5 | — | — | 5 | — | — | — | — | — | — |
| 38* | 0 | 80 | — | — | 5 | — | — | — | 5 | — | — | 5 | — | — | — |
| 39* | 0 | 75 | — | — | 5 | — | — | — | 5 | 5 | — | 5 | — | — | — |
| 40* | 0 | 70 | — | — | 5 | 5 | — | — | 5 | — | 5 | 5 | — | — | — |
| 41* | 0 | 75 | 2.5 | — | — | 5 | — | — | 2.5 | — | 2.5 | — | 2.5 | — | 5 |

*Comparative examples

TABLE 2-continued

| Data No. | Diffusing component Sample No. | Electrical characteristics | | | |
|---|---|---|---|---|---|
| | | V/mm (volt) | α | ε | tan δ (%) |
| 28 | 28 | 222 | 15 | 43700 | 0.4 |
| 29 | 29 | 136 | 13 | 49800 | 0.4 |
| 30 | 30 | 164 | 22 | 48600 | 0.5 |
| 31 | 31 | 238 | 14 | 41100 | 0.6 |
| 32 | 32 | 201 | 8 | 45000 | 0.9 |
| 33 | 33 | 219 | 16 | 44300 | 0.4 |
| 34 | 34 | 188 | 7 | 41900 | 0.3 |
| 35 | 35 | 157 | 14 | 39800 | 0.8 |
| 36* | 36* | 288 | 2 | 41700 | 0.3 |
| 37* | 37* | 263 | 2 | 39300 | 0.3 |
| 38* | 38* | 215 | 2 | 44200 | 0.5 |
| 39* | 39* | 248 | 3 | 42900 | 0.7 |
| 40* | 40* | 303 | 2 | 37800 | 0.5 |
| 41* | 41* | 280 | 2 | 40600 | 0.4 |

*Comparative examples

In Table 2, V/mm is varistor voltage per unit thickness at 1 mA, α is the voltage nonlinearity index between 0.1 mA and 1 mA, ε is apparent dielectric constant and tan δ is dielectric loss angle. It is apparent from Table 2 that the voltage nonlinearity index α is great when a diffusing composition containing perovskite type oxide is allowed to diffuse, whereas α is as small as about 2 when a diffusing composition containing no perovskite type oxide is allowed to diffuse. Further, the values of dielectric constant ε and tan δ are very good as a capacitor. Particularly, the element of Data No. 30 can be said to be an element having a sufficient composite function in that α is greater than 20 which is a very good value as a varistor, and the dielectric constant is as great as about 50,000. Table 3 illustrates the state of characteristics obtained by replacing the $SrTiO_3$ component of the composition of No. 30 with other perovskite type oxides. The effect achieved is nearly comparable to that in the case of $SrTiO_3$, even if the latter is replaced with other perovskite type oxides used there.

TABLE 3

| Data | Replacing component | Electric characteristics | | | |
|---|---|---|---|---|---|
| | | V/mm (volt) | α | ε | tan δ (%) |
| 42 | $BaTiO_3$ | 147 | 16 | 51700 | 0.6 |
| 43 | $Ca_{0.3}Sr_{0.7}TiO_3$ | 173 | 14 | 48200 | 0.7 |
| 44 | $Sr_{0.9}Ba_{0.1}TiO_3$ | 153 | 20 | 50500 | 0.5 |
| 45 | $Sr_{0.9}Pb_{0.1}TiO_3$ | 180 | 18 | 46900 | 0.4 |
| 46 | $SrSn_{0.1}Ti_{0.9}O_3$ | 151 | 11 | 47200 | 0.5 |
| 47 | $SrTi_{0.9}Zr_{0.1}O_3$ | 133 | 19 | 49300 | 0.8 |

Next, a circuit shown in FIG. 1 was made by using the element of Data No. 30, and the state of output was investigated against the noise input as shown in FIG. 3. As the result, noise could be suppressed as expressed by the output curve b of FIG. 3. In the case of the hitherto known filter circuit shown in FIG. 2A, the state of output is as expressed by the output curve c of FIG. 3, and the noise is not removed sufficiently. In the hitherto known filter circuit of FIG. 2B involving a varistor, the number of parts is greater than in the circuit of FIG. 1 involving the element of the present invention because the former includes a varistor, though the effect obtained is equal. In FIG. 1, FIG. 2A and FIG. 2B, 1 is the element of this invention, 2 is a coil, 3 is a capacitor and 4 is a varistor.

Although a limited number of perovskite type oxides have been used as the diffusing component in the above-mentioned examples, an equal effect can be expected with other perovskite type oxides. Further, the sintered body comprising an agglomerate of semiconductor particles is not limited to that mentioned in the examples, since any sintered bodies of other n type semiconductor particles can be expected to give the same effect as above.

Industrial Applicability

As has been explained above, the epoch-making element of the present invention herein proposed has a composite function of high voltage absorption and capacitor action and the functions of two elements, a varistor and a capacitor, can be fulfilled simultaneously with only one element. For example, it simplifies the hitherto known noise filter circuits and contributes to miniaturization, elevation of performances and reduction of cost. Accordingly, it has a great usefulness such as the possibility of application to the usage of, for example, prevention of erroneous operation in microcomputer-controlled instruments, so that a great industrial effect can be expected of it.

We claim:

1. A composite function element, comprising:
   a sintered body having a grain boundary and at least first and second surfaces, said sintered body comprising an agglomerate of n-type semiconductor particles;
   a high resistance thin film layer provided at the grain boundary of the sintered body at one of said surfaces, said film layer including at least one element selected from the group consisting of barium, strontium, calcium and lead; at least one element selected from the group consisting of titanium, tin and zirconium; and at least one element selected from the group consisting of bismuth, boron, cerium, cobalt, copper, iron, lanthanum, lithium, manganese, niobium, antimony, silicon and zinc; and
   at least one pair of electrodes respectively provided on said surfaces of the sintered body,
   said composite function element being characterized in that it acts as a capacitor when lower voltage is passing between the electrodes and acts as a varistor when higher voltage is passing between the electrodes.

2. The composite function element according to claim 1, wherein the sintered body comprises an n-type sintered body containing strontium titanate as its principal component; and the high resistance thin film layer comprises a high resistance diffused layer provided at the grain boundary of the sintered body, said diffused layer comprising an agglomerate of perovskite type oxides including at least one element selected from the group consisting of barium, strontium, calcium and lead; at least one element selected from the group consisting of titanium, tin and zirconium; and at least one oxide of an element selected from the group consisting of bismuth, boron, cerium, cobalt, copper, iron, lanthanum, lithium, manganese, niobium, antimony, silicon and zinc.

* * * * *